United States Patent

Rossignol

Patent Number: 5,505,079
Date of Patent: Apr. 9, 1996

[54] PROCESS AND DEVICE FOR DETECTING COMBUSTION IRREGULARITIES IN AN ENGINE PARTICULARLY AT MEDIUM AND HIGH SPEED

[75] Inventor: Alain Rossignol, Toulouse, France

[73] Assignee: Siemens Automotive S.A., Toulouse Cedex, France

[21] Appl. No.: 318,891

[22] PCT Filed: Mar. 30, 1993

[86] PCT No.: PCT/EP93/00773

§ 371 Date: Oct. 7, 1994

§ 102(e) Date: Oct. 7, 1994

[30] Foreign Application Priority Data

Apr. 10, 1992 [FR] France .................................. 92 04532

[51] Int. Cl.⁶ .......................... G01M 15/00; F02D 41/14
[52] U.S. Cl. ...................... 73/117.3; 73/116; 364/431.07
[58] Field of Search ............................... 73/117.2, 117.3, 73/116; 364/431.07, 431.08

[56] References Cited

U.S. PATENT DOCUMENTS

| | | | |
|---|---|---|---|
| 4,691,286 | 9/1987 | Obayashi et al. | 364/431.08 |
| 5,086,741 | 2/1992 | Nakamura et al. | 123/419 |
| 5,153,834 | 10/1992 | Abo et al. | 73/116 |
| 5,191,788 | 3/1993 | Nishimura | 73/117.3 |
| 5,200,899 | 4/1993 | Ribbens et al. | 73/116 |
| 5,239,473 | 8/1993 | Ribbens et al. | 73/117.3 |
| 5,255,560 | 10/1993 | Klenk et al. | 73/116 |
| 5,263,365 | 11/1993 | Muller et al. | 73/117.3 |
| 5,287,737 | 2/1994 | Osawa et al. | 73/117.3 |
| 5,311,771 | 5/1994 | Young | 73/117.3 |
| 5,331,848 | 7/1994 | Nakagawa et al. | 73/116 |
| 5,345,817 | 9/1994 | Grenn et al. | 73/117.3 |
| 5,359,518 | 10/1994 | Wimmer | 73/116 |
| 5,381,689 | 1/1995 | Ishida | 73/116 |

FOREIGN PATENT DOCUMENTS

WO90/15235  12/1990  WIPO.
WO91/02892  3/1991  WIPO.

*Primary Examiner*—Richard Chilcot
*Assistant Examiner*—George Dombroske
*Attorney, Agent, or Firm*—Hill, Steadman & Simpson

[57] ABSTRACT

The process and device are for detecting combustion irregularities in an internal combustion engine. The process consists in measuring the time intervals between the angular positions of the crankshaft, in grouping these time differences in sets of samples corresponding to each combustion phase, in calculating from each set a critical parameter that is representative of the variation in the instantaneous speed at the moment of combustion, and in comparing this parameter with a fault threshold in order to make a combustion diagnosis. Diagnosis at medium and high speeds is thus possible.

13 Claims, 2 Drawing Sheets

PROCESS AND DEVICE FOR DETECTING COMBUSTION IRREGULARITIES IN AN ENGINE PARTICULARLY AT MEDIUM AND HIGH SPEED

BACKGROUND OF THE INVENTION

The invention concerns a process for detecting combustion irregularities in an internal combustion engine in order to make a combustion diagnosis, particularly at medium and high speed. It extends to a device for implementing said process and to injection engine control systems equipped with such devices.

Combustion irregularities in an internal combustion engine (misfires and partial combustion) are interesting to diagnose because they are indicative of various disorders liable to affect either the preparation of the air/fuel mixture, or the ignition means, or a mechanical component (tightness of a valve). Moreover, these combustion defects increase pollutant emissions and can lead to external combustion causing damage to catalytic exhaust systems.

The following vocabulary is used below:

active TDC (active top dead center): angular position of the crankshaft which precedes the expansion of the gases, corresponding to the minimum distance between the piston and the top of the cylinder head, combustion phase of a cylinder: phase during which the explosion of the gases occurs after ignition, this phase extending at medium and high speeds from ignition to about half of expansion, active cylinder: cylinder in which combustion takes place, cycle: time interval between two active TDC of a cylinder.

Partial combustion in a given cycle causes a variation of the drive torque in an engine and hence a variation in the engine speed in comparison with the average speed considered over many cycles. Today, it is known how to detect these speed variations, on the one hand, at low engine speed (below 3000 rpm), irrespective of the load applied, and, on the other, at medium speed under high load. For example, the publication by Günther Plapp et al, 'Methods of on-board misfire detection, SAE 900232, 1990', describes a process in which the average engine speed is compared during successive combustion phases in order to detect significant variations. However, at high speed or under low load, these variations in average speed have relatively low values and are impossible to detect. Furthermore, irrespective of the speed, these relative variations are not necessarily indicative of a combustion irregularity, and may be confused with variations in the engine speed. To make a reliable diagnosis, it is accordingly necessary to equip the engine with an additional displacement transducer (French Patent No. 91.12743) or with an accelerometer, to invalidate the fault detection in the transient phases. Another publication, by W. B. Ribbens and C. Rizzoni, 'Applications of precise crankshaft position measurements for engine testing, control and diagnosis, SAE 890885, 1989', describes a process in which matrix algebra calculations are carried out on a set of instantaneous speed measurements taken during each engine cycle, in order to determine the absolute value of the drive torque for each cylinder and thus to determine abnormal variations in said torque. However, these calculations are highly complex and demand powerful computation resources, which cannot conceivably be mounted onboard an automotive vehicle. Moreover, according to this publication, it appears that the process is only usable at low speed (less than 3500 rpm).

SUMMARY OF THE INVENTION

The present invention proposes to enable a combustion diagnosis irrespective of the engine speed and the load applied to the engine. It aims in particular to detect combustion irregularities at medium and high speed, for which the process of the invention is ideally applicable. For low speeds, the process of the invention could possibly be applied, although it is highly sensitive. It can also be supplanted by a process of a known type, particularly a simplified torque estimation process.

The detection process concerned by the invention is of the type consisting in measuring the time intervals between predetermined angular positions of a rotating part integral with the crankshaft, in calculating from these intervals a parameter representative of a variation in speed, and in comparing this parameter with a fault threshold. The process according to this invention is characterized in that:

(a) for each phase of combustion of the engine, a sampling window is defined, centered on an angular position, called the reference position, corresponding to a predetermined moment of the combustion phase concerned, said sampling window exhibiting a width less than twice the angular distance between two combustions, (b) in each sampling window, a series of measurements is taken of time intervals angularly distributed on both sides of the reference position, in order to obtain a set of samples $\Delta T_1, \ldots \Delta T_n$ on said window, (c) for each set of samples, a linear combination is made of the values measured $\Delta T_1, \ldots \Delta T_n$ in order to obtain a parameter, called the critical parameter, which is representative of the variation in the instantaneous speed at the moment of combustion, (d) the critical parameter resulting from the linear combination is compared with the above-mentioned fault threshold, and information is transmitted representative of a fault if said threshold is exceeded.

Thus, for each cycle, the process of the invention monitors a specific moment of combustion while determining, by simple linear combinations, a parameter representative of the variation in the instantaneous speed at this moment. This moment is chosen in particular to correspond approximately to the maximum instantaneous drive torque of the combustion phase concerned, in order to increase the sensitivity of detection. To achieve this, the reference position can be determined with respect to the active TDC, such as the angular position located approximately at the first quarter of the angular distance between two successive active TDC. The closely time-related character of the critical parameter (image of the variation in speed at a given moment), the high sensitivity obtained, and the simplicity of the calculations implemented allow detection at any speed.

The process can be implemented in particular in the following conditions:

(b) in each sampling window, the measurements of time intervals are symmetrically distributed about the reference position, in order to obtain approximately half of the samples $\Delta T_1, \ldots \Delta T_{n/2}$ before the reference position and the other half of the samples $\Delta T_{n/2+1}, \ldots \Delta T_n$ after said position, (c) a linear combination is made of the samples by assigning negative coefficients to the first half of the samples $\Delta T_1, \ldots \Delta T_{n/2}$ and symmetrical positive coefficients to the second half of the samples $\Delta T_{n/2+1}, \ldots \Delta T_n$.

This method of implementation leads to a critical parameter which is a realistic image of the variations in the instantaneous speed in the reference position. The number of samples determines the accuracy of the parameter, and a suitable choice of the coefficients makes it possible to optimize the sensitivity.

The width of the sampling window is selected so as to avoid the need to include, in the calculation of a given critical parameter (corresponding to a predetermined combustion phase), measurements that are irrelevant to this combustion (which concern other combustion phases). In particular, a window width of 1.5 times the angular distance between two combustions gives good results and makes it possible both to have a sufficient number of suitably distributed samples (good accuracy of the parameter) and to avoid a disturbance due to the other combustions.

For example, the process of the invention yields satisfactory accuracy and sensitivity by taking account of six measurements during each combustion phase in the following conditions:

(b) in each sampling window, three measurements $\Delta T_1$, $\Delta T_2$ and $\Delta T_3$ are taken before the reference position and three measurements $\Delta T_4$, $\Delta T_5$ and $\Delta T_6$ after said position, (c) the following linear calculation is carried out to obtain the critical parameter:

$$-\Delta T_1 - 3\Delta T_2 - 2\Delta T_3 + 2\Delta T_4 + 3\Delta T_5 + \Delta T_6$$

Such a process can be implemented with toothed-wheel angular position sensors currently available on the market, and leads to good detection accuracy, in view of the geometric tolerances obtained for rotating parts by the usual machining means.

Furthermore, the fault threshold with which the critical parameter is compared could also be calculated from the engine speed and from the load applied to the engine. However, according to a preferred embodiment, a mapping of fault thresholds, giving a threshold value for each engine speed and average load applied, is previously stored in memory. At each cycle (particularly by a conventional measurement at each TDC), the engine speed and the average load applied are detected, and the corresponding fault threshold is extracted in order to make the above-mentioned comparison. The load can be measured by any conventional means (negative pressure in the intake manifold, air flow rate), while the speed is measured at each turn of the engine on the means traditionally provided to measure it.

According to another characteristic of the process of the invention, to obtain the critical parameter, the result of the linear combination of the samples is corrected by a multiplication factor $1/T^3$, where T is a time interval proportional to the time of one rotation of the rotating part. In these conditions, at constant load, the fault thresholds display slight variations as the speed varies, thus reducing the number of thresholds to be memorized to cover the entire operating range of a given engine or, as required, facilitating the calculation of these fault thresholds.

The mapping of the fault thresholds can be defined previously:

by artificially causing a lack of combustion for predetermined speeds and loads, by taking measurements of time intervals and by calculating the corresponding physical parameters, and by memorizing a fraction of these parameters as fault thresholds.

It is possible in particular to memorize of about ¾ of these parameters as fault thresholds.

According to another characteristic of the process, in each combustion phase, information is generated identifying the active cylinder, and each fault indication is associated with this identification information. The diagnosis thus helps to identify the faulty cylinder and, as required, to take provisional remedial action on it (particularly injection cutoff to avoid pollution and damage to the catalytic converter).

The invention extends to a device capable of implementing the process defined above, comprising an angular position sensor with a toothed wheel carried by a rotating part integral with the crankshaft, in order to supply angular position information at each engine cycle as well as absolute position information, a suitable counter to generate values of time differences from the information provided by the sensor, means of memorizing the time difference values, means of memorizing fault thresholds, means for determining the engine speed and load, and computation means for processing the time difference values and their comparison with the fault thresholds. According to the invention, this device is characterized in that:

the angular position sensor and the counter are adapted to provide a time resolution less than 1 µs, the computation means are programmed:

to group the time difference values in sets of samples, each set being centered on the reference angular position calculated from the absolute position information, and being contained in a predetermined window framing this reference position, to carry out a linear combination on each set of samples in order to obtain the critical parameter at each cycle, to read, in the fault threshold memorization means, the threshold corresponding to the speed and load provided by the means of determination, to compare the critical parameter with this fault threshold, and to generate information representative of a fault in the case where said threshold is exceeded.

The time resolution allowed by the sensor and the counter makes it possible to measure the time differences at high speed with sufficient accuracy to detect slight variations in instantaneous speed (greater than about 0.2%) and thus to obtain a satisfactory fault diagnosis irrespective of the load.

The computation means can in particular be programmed to group the time difference values in sets of six samples $\Delta T_1, \Delta T_2, \ldots \Delta T_6$, and to make a calculation on each set of samples according to the following algorithm:

$$(1/T^3)(-\Delta T_1 - 3\Delta T_3 - 2\Delta T_3 + 2\Delta T_4 + 3\Delta T_5 + \Delta T_6)$$

where T is a parameter proportional to the duration of one rotation of the toothed wheel of the angular position sensor.

The device of the invention can in particular be mounted on an injection engine control system to provide a combustion diagnosis to the driver and, as required, to perform a safety action such as injection cutoff. The device can also be mounted on a test bench or an external diagnostic apparatus, available to professionals, to carry out engine adjustments and/or repairs.

The description below in reference to the appended drawings illustrates an example of the process and of the device of the invention for a five-cylinder, four-stroke engine.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
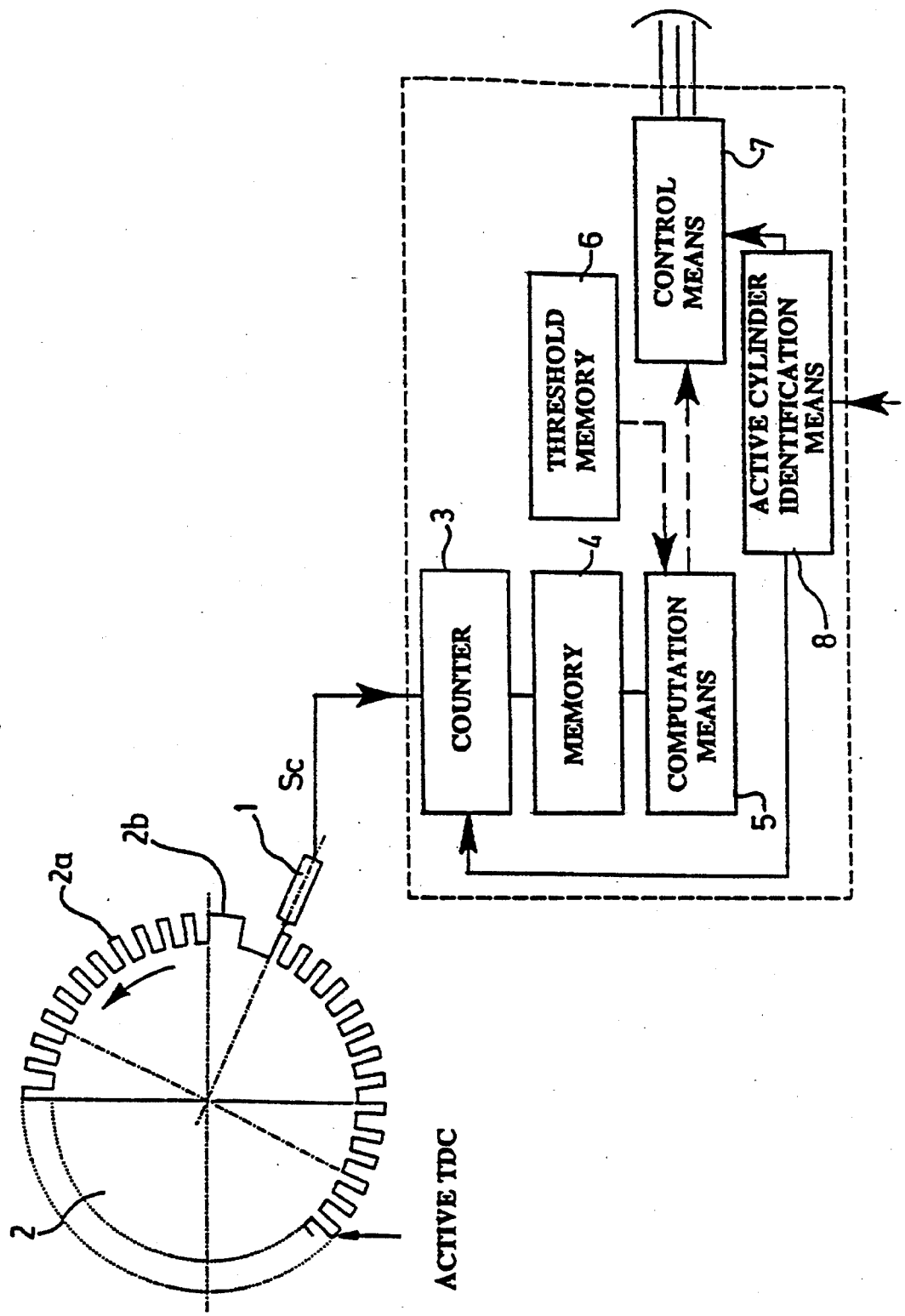
FIG. 1 is a functional diagram of the device.

An angular position sensor 1 is slaved to a fixed part of the engine facing a toothed wheel 2 integral with the crankshaft. This toothed wheel in the example has 58 uniformly-spaced identical teeth, such as 2a, and one singular tooth 2b (width equivalent to the width of three standard teeth) of which the absolute position is perfectly known with respect to the crankshaft. This sensor, known in itself (magnetic sensor, Hall effect), generates a signal 8c containing at each turn of the crankshaft information on the angular position $I_c$ corresponding to the passage of each standard tooth and an indication of the absolute position $I_a$ corresponding to the passage of the singular tooth.

Figure 2:
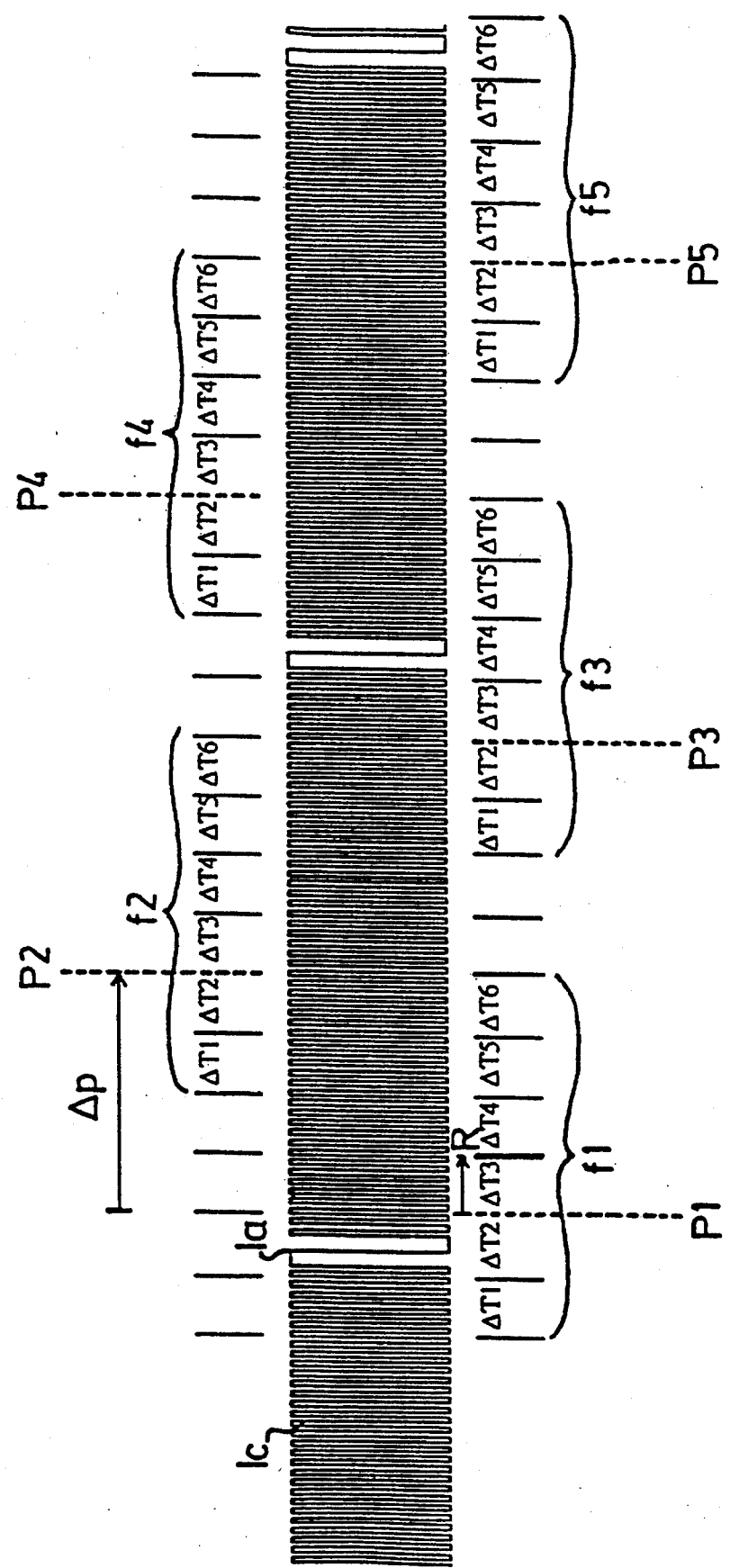
FIG. 2 is an explanatory diagram of the process, showing the shape of the pulses of the angular position sensor and symbolizing the time difference measurements.

These indications are shown in FIG. 2 by a series of pulses, assuming that electronic shaping means are associated with the sensor 1 (Hall effect sensor, for example). The absolute position indications $I_a$ help to determine the position of the active TDC, and FIG. 2 shows the positioning on a cycle of the five active TDC corresponding to the five cylinders $P_1$, $P_2$, $P_3$, $P_4$ and $P_5$.

A counter 3 receives the signal Sc generated by sensor 1 and delivers the time difference values $\Delta T_1$, $\Delta T_2$ ... by a measurement of the time intervals between the passage of predetermined teeth. In the example, the time differences between the passage of six teeth are measured, and ten measurements are obtained per turn of the crankshaft.

These time intervals are memorized in a memory 4 and processed by the computation means 5.

These computation means are programmed to group the time difference values in sets of samples $\Delta T_1$, $\Delta T_2$ ... $\Delta T_6$ from which the critical parameter is calculated. For each cylinder (for example cylinder 1), they define a sampling window $f_1$ centered on a reference angular position R which is positioned with respect to the absolute position information $I_a$, hence with respect to the active TDC of the cylinder $P_1$ associated with it. Advantageously, the setting of the reference position R is programmed so that it is located in the first quarter of the angular distance $\Delta p$ between two successive active TDC $P_1$, $P_2$: this position corresponds approximately, at medium and high speed, to the maximum instantaneous torque.

The computation means are programmed so that the width of each sampling window $f_1$, $f_2$ ... is equal to 1.5 $\Delta p$, in order to obtain the maximum number of samples in each window, while avoiding the consideration of samples that are strongly influenced by another combustion. In the preferential example described, six samples are collected in each window: three before the reference position R ($\Delta T_1$, $\Delta T_2$ and $\Delta T_3$), and three after said position ($\Delta T_4$, $\Delta T_5$ and $\Delta T_6$).

It should be noted that, due to the width adopted for these windows $f_1$, $f_2$, ..., some samples are common to two successive windows (corresponding to two successive cylinders). For example, samples $\Delta T_5$ and $\Delta T_6$ of window $f_1$ of the first cylinder are resumed as samples $\Delta T_1$ and $\Delta T_2$ in window $f_2$ of the second cylinder.

For each window, the computation means are programmed to make the following linear combination over the set of samples, with correction by a multiplication factor $1/T^3$, where T is the duration of one crankshaft rotation:

$$(1/T^3)(-\Delta T_1 - 3\Delta T_2 - 2\Delta T_3 + 2\Delta T_4 + 3\Delta T_5 + \Delta T_6)$$

The critical parameter is thus obtained. It can be demonstrated that it is representative of the variation in the instantaneous speed at the reference time R of the combustion phase, with respect to the average speed between two consecutive active TDC.

Furthermore, the device comprises a memory 6 of fault thresholds containing a mapping of the thresholds for each speed and each load of the engine operating range. Conventionally, the computation means are also programmed to determine the engine speed and load from the information received from counter 3 and from an intake pressure sensor, for example. After each calculation of a critical parameter, the computation means retrieve from the memory 6 the threshold corresponding to the speed and the load, and compare the critical parameter with this threshold.

In the case of overrun, a fault indication is transmitted to the control means 7 in order to actuate the action to be executed (visual or sound alarm, action on an injection nozzle).

The device is supplemented by means 8 for identifying the active cylinder. In the case described of a five-cylinder engine, these means transmit the information of the active cylinder to the counter 3 in order to distinguish in each cycle the first and second turn of the crankshaft (this being necessary for four-stroke engines with an uneven number of cylinders due to the dissymmetry of the two rotations of each cycle). Furthermore, in the case of action on an injection nozzle, these means 8 help to identify the injection nozzle of the faulty cylinder, on which the action must be taken.

The mapping of fault thresholds is memorized previously in the memory 6 by causing artificially, at different speeds and loads, combustion absences or misfires in a cylinder, distributed over time (one misfire every thirty cycles, for example), by taking measurements of the corresponding time differences, by calculating the critical parameter, and by memorizing a fraction of this parameter (particularly ¾) as fault thresholds.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

WHAT IS CLAIMED IS:

1. A process for detecting combustion irregularities of an internal combustion engine, serving to make a combustion diagnosis, particularly at medium and high speed, wherein time intervals are measured between predetermined angular positions of a rotating part integral with a craftshaft, a parameter representative of a variation in speed is calculated from these differences, and this parameter is compared with a fault threshold, said process comprising the steps of:

(a) for each phase of combustion of the engine, defining a sampling window, centered on an angular reference position, corresponding to a predetermined moment of a reference combustion phase, said sampling window having a width less than twice the angular distance between two combustions, (b) in each sampling window, taking a series of measurements of time intervals angularly distributed on both sides of the reference position, in order to obtain a set of samples $\Delta T_1, \ldots \Delta T_n$ on said window, the width of each sampling window having a substantially maximum number of samples in the set of samples for one of said two combustions without any substantial influence on said set of samples by the other of said two combustions, (c) for each set of samples, forming a linear combination of the values measured $\Delta T_1, \ldots \Delta T_n$ in order to obtain a critical parameter, which is representative of a variation in instantaneous speed at the moment of combustion, (d) comparing the critical parameter resulting from the linear combination with the fault threshold, and providing information representative of a fault if said threshold is exceeded.

2. The process as claimed in claim 1, wherein active TDC of the engine are detected, and wherein the reference position is defined with respect to these active TDC as an angular position located approximately in a first quarter of an angular distance between two successive active TDC.

3. The process as claimed in claim 1, wherein:

in step (b) in each sampling window, the measurements of time intervals are symmetrically distributed about the reference position, in order to obtain approximately half of the samples $\Delta T_1, \ldots \Delta T_{n/2}$ before the reference position and the other half of the samples $\Delta T_{n/2-1}, \ldots \Delta T_n$ after said position, in step (c) a linear combination is formed of the samples by assigning negative coefficients to the first half of the samples $\Delta T_1, \ldots \Delta T_{n/2}$ and symmetrical positive coefficients to the second half of the samples $\Delta T_{n/2-1}, \ldots \Delta T_n$.

4. The process as claimed in claim 1, wherein in step (a) a sampling window is defined with a width approximately equal to 1.5 times the angular distance between two combustions.

5. The process as claimed in claim 4, wherein:

in step (b) in each sampling window, three measurements $\Delta T_1, \Delta T_2$ and $\Delta T_3$ are taken before the reference position and three measurements $\Delta T_4, \Delta T_5$ and $\Delta T_6$ are taken after said position, in step (c) the following linear calculation is carried out to obtain the critical parameter:

$$-\Delta T_1 - 3\Delta T_2 - 2\Delta T_3 + 2\Delta T_4 + 3\ \Delta T_5 + \Delta T_6$$

6. The process as claimed in claim 1, wherein, to obtain the critical parameter, the result of the linear combination of samples is corrected by a multiplication factor $1/T^3$, where T is a time interval proportional to a duration of one rotation of the rotating part.

7. The process as claimed in claim 1, wherein:

a fault threshold mapping is first stored giving a threshold value for each engine speed and average load applied to the engine, the engine speed and the average load applied are detected, and a corresponding fault threshold is extracted, the critical parameter is compared with the fault threshold thus extracted.

8. The process as claimed in claim 1, wherein a fault threshold mapping is previously defined:

by artificially causing a lack of combustion for predetermined speeds and loads, by taking measurements of time intervals and by calculating corresponding critical parameters, and by storing a fraction of these parameters as fault thresholds.

9. The process as claimed in claim 1, wherein, at each combustion phase, information is generated identifying an active cylinder, and each fault indication is associated with this identification information.

10. The device as claimed in claim 9, wherein the computation means are programmed to group the time difference values in sets of six samples $\Delta T_1, \Delta T_2 \ldots \Delta T_6$ and to make a calculation according to the following algorithm on each set of samples:

$$(1/T^3)\ (-\Delta T_1 - 3\Delta T - 2\Delta T_3 + 2\Delta T_4 + 3\Delta T_5 + \Delta\ T\Delta T_6)$$

where T is a parameter proportional to the duration of one rotation of the toothed wheel associated with the angular position sensor.

11. A device for detecting combustion irregularities in an internal combustion engine, comprising: an angular position sensor with a toothed wheel carried by a rotating part integral with a crankshaft of the engine, said sensor generating angular position information for each engine cycle, as well as absolute position information, a counter adapted to transmit time difference values from the information generated by the sensor, means for storing the time difference values, means for storing fault thresholds, means for determining engine speed and load of the engine, and computation means for processing the time distance values and their comparison with the fault thresholds, the angular position sensor and the counter being adapted to provide a time resolution less than 1 μs, the computation means being programmed:

to group the time difference values in sets of samples, each set being centered on a reference angular position calculated from the absolute position information, and being contained in a predetermined window framing this reference position, said predetermined window having a substantially maximum number of samples in the set of samples associated with a first combustion without any substantial influence or said maximum number of samples by a successive second combustion, to carry out a linear combination on each set of samples in order to obtain a critical parameter at each cycle, to read, in the means for storing fault thresholds, a respective threshold corresponding to a respective speed and load provided by the means for determining, to compare the critical parameter with this respective fault threshold, and to generate information representative of a fault in the case where said respective fault threshold is exceeded.

12. The device as claimed in claim 11, wherein the device further comprises means for identifying a cylinder in the course of combustion, in order to transmit identification information associated with the fault indication.

13. The device as claimed in claim 11 wherein the device is utilized in an injection engine control system.

* * * * *